US008965988B1

(12) United States Patent
Negahban et al.

(10) Patent No.: US 8,965,988 B1
(45) Date of Patent: Feb. 24, 2015

(54) SYSTEM AND METHOD FOR PROVIDING AN EVENT-BASED AND SHARED PAGE CONNECTIVITY PLATFORM

(71) Applicants: Mehrdad Negahban, McLean, VA (US); Andreas Alexandropoulos, Athens (GR); Allen Steven Kay, Woodcliff Lake, NJ (US)

(72) Inventors: Mehrdad Negahban, McLean, VA (US); Andreas Alexandropoulos, Athens (GR); Allen Steven Kay, Woodcliff Lake, NJ (US)

(73) Assignee: beamSmart, Inc., McLean, VA (US)

( * ) Notice: Subject to any disclaimer, the term of this patent is extended or adjusted under 35 U.S.C. 154(b) by 0 days.

(21) Appl. No.: 13/767,450

(22) Filed: Feb. 14, 2013

(51) Int. Cl.
*G06F 15/16* (2006.01)
*H04L 29/08* (2006.01)

(52) U.S. Cl.
CPC .............................. *H04L 29/08117* (2013.01)
USPC ...................................... 709/206; 455/404.2

(58) Field of Classification Search
USPC ........................................ 709/206; 455/404.2
See application file for complete search history.

(56) References Cited

U.S. PATENT DOCUMENTS

| | | | |
|---|---|---|---|
| 8,792,867 B1 | 7/2014 | Negahban et al. | 455/414.1 |
| 2002/0156787 A1* | 10/2002 | Jameson et al. | 707/10 |
| 2005/0239477 A1 | 10/2005 | Kim et al. | 455/456.1 |
| 2007/0053306 A1 | 3/2007 | Stevens | 370/252 |
| 2007/0214237 A1* | 9/2007 | Stibel et al. | 709/217 |
| 2008/0132251 A1* | 6/2008 | Altman et al. | 455/457 |
| 2009/0027499 A1 | 1/2009 | Nicholl | 348/158 |
| 2009/0187486 A1* | 7/2009 | Lefenfeld et al. | 705/14 |
| 2009/0319616 A1* | 12/2009 | Lewis et al. | 709/206 |
| 2013/0040600 A1* | 2/2013 | Reitnour et al. | 455/404.2 |
| 2013/0041734 A1* | 2/2013 | Dean et al. | 705/14.23 |
| 2013/0104035 A1* | 4/2013 | Wagner et al. | 715/240 |
| 2014/0155018 A1 | 6/2014 | Fan et al. | 455/404.1 |

* cited by examiner

*Primary Examiner* — Thomas Dailey
(74) *Attorney, Agent, or Firm* — Pillsbury Winthrop Shaw Pittman LLP

(57) ABSTRACT

The invention relates providing an event-based connectivity platform that creates and communicates shared pages based on location and other information obtained from devices that automatically provide the location and other information. A system may include a page server that creates an event-centric shared page responsive to a single button press or other indication. Once created, the page server may invite other users to access the shared page. User devices that have access to the shared page, including the user device that cause the shared page to be created and/or other user devices, may automatically provide updates to the page server. The devices may automatically provide the updates at various times without intervention by the user. The automatically provided updates may include location information. Users may also provide other information such as image, audio, and text for updating the event-centric shared page.

28 Claims, 6 Drawing Sheets

SYSTEM AND METHOD FOR PROVIDING AN EVENT-BASED AND SHARED PAGE CONNECTIVITY PLATFORM

FIELD OF THE INVENTION

The invention relates to systems and methods for providing an event-based and shared page connectivity platform that creates and communicates shared pages based on location and other information obtained from devices that automatically provide the location and other information.

BACKGROUND OF THE INVENTION

Conventional methods of communicating information typically include Short Message Service ("SMS") text messaging, emailing, posting to social media, or calling individuals. However, these conventional information sharing techniques involve manual updates from users. For example, some location-based services allow a user to share location information to others. However, providing location information using these services is typically a manual process such as various "check-in" processes that are conventionally used. Furthermore, information sharing using conventional methods typically involves sharing information centered around a user account. However, such information sharing does not allow dynamic creation of shared pages centered around events.

Thus, providing information, including location information, centered about an event rather than an account can be cumbersome.

SUMMARY OF THE INVENTION

The invention relates to systems and methods for providing an event-based and shared page connectivity platform that creates and communicates shared pages based on location and other information obtained from devices that automatically provide such information.

A system may include a page server that creates and updates a shared page. In some embodiments, the page server may create the shared paged based on input from a user. For example, the user may cause an event-centric shared page to be generated with the click of a button or other indication to create a shared page. Responsive to the button press or other indication, the page server may create the shared page. In some embodiments, the page server may detect an event that automatically triggers creation of the shared page. The event may include, for example, an automobile collision, a fire alarm, a device moving to a particular location (e.g., geofenced location), and/or other events that may be detected by the page server.

Once created, the page server may invite or otherwise indicate to other users that the shared page has been created. User devices that have access to the shared page (e.g., user devices with which the shared page has been shared), including the user device of the user who created the page and/or other user devices, may provide updates to the page server. The devices may automatically provide the updates at various times without intervention by the user. For example, a user device may automatically provide location information that indicates a location of the user device. The page server may update the shared page using the location information. In this manner, the shared page may update the shared page with the locations of the users with whom may the shared page has been shared and may update the locations as new (updated) location information is received from the shared user devices.

In some embodiments, the page server may identify invitees who should have access to or otherwise receive the shared page based on an input from a user. For example, the page server may receive input from the user that specifies that a particular user, group of users, and/or the general public should receive/have access to the shared page. In some embodiments, the page server may identify invitees automatically based on location, user profiles, time, and/or other information. For example, a shared page may be provided to users who are at a particular location (such as a geofenced area). In this manner, shared pages may be targeted to particular locations. In another example, a shared page may be provided based on user profiles. A shared page may be provided to a user who has one or more interests as indicated by the user's profile. In another example, a shared page may be provided based on a time. For example, the shared page may be made available based on when the shared page expires and/or a time when the shared page should be provided to others.

In a particular example, the user may plan to attend a social event and may wish to create a shared page centered about the social event. The user and others may provide automatic updates that are used to update the shared page. Because the shared page is event-centric rather than account-centric, various different shared pages may be created and shared dynamically with different sets of relevant users.

In some embodiments, the shared page may be associated with an expiration (e.g., a date and/or time) such that updates to the shared page is no longer accepted. In these embodiments, the page server may communicate an indication to the various devices that causes the devices to terminate automatic updates. In some embodiments, the shared page is no longer accessible (e.g., viewable) after the expiration.

In some embodiments, the page server share the shared page to others based on different levels of sharing provided by the user. For example, the user may add other users with whom the page should be shared, indicate that the shared page be accessible by the public (e.g., may be communicated by the platform to all users), indicate that the shared page be accessible to contacts of the user, and/or provide other levels of sharing. In some embodiments, the user may allow (e.g., assign a role) to another user that grants different levels of access to the shared page. For example, different levels of access may include an ability to add other users with whom the page should be shared, read-only access, read and update access, and/or other levels of accessing the shared page. In another example, the different levels of access may include an ability to map objects, media, and/or other content to a shared page such that different users may be granted different levels of permission to add content, modify content of, and/or delete content from a page.

In some embodiments, information other than location information may be provided to the page server by the various devices with which the shared page has been shared. For example, video, audio, text, and/or other information may be provided to the page server such that users may post real-time messages to the shared page. Unlike conventional information sharing platforms, the shared page may receive information automatically provided by different devices and be created dynamically such that shared pages may be centered around events rather than user accounts.

In some embodiments, the page server may create a shared page based on parameters provided by the user at the time of creating the shared page. In these embodiments, the user may dynamically create and configure shared pages on-the-fly. In some embodiments, the page server may create a shared page based on a page template that is preconfigured by the user or platform to provide the parameters. In these embodiments, a user may dynamically create shared pages using a template that the user and/or the platform have already created. In some embodiments, the page server may create a shared page based on parameters provided by the user at the time of creating the shared page and a page template. In these embodiments, the user may alter or add parameters to the page template for creating a shared page.

In some embodiments, the page server may generate geofence alerts based on the shared page. For example, location information from the device of the user who created the shared page may be periodically received by the page server. The shared page may be configured such that an alert is generated when the user device is within one or more geofenced areas and/or is otherwise at a particular location. For example, the page server may generate alerts to another user as the user gets closer to a destination.

In some embodiments, the page server may provide notifications when an update to the shared page is received. For example, the page server may provide an SMS text, an email, a social media posting, and/or other communication that includes the notification to one or more users with whom the page has been shared.

Various entities may use the event-based connectivity platform. For example, users may use the platform to connect socially and provide updates centered about an event. Marketers may use the platform to provide promotions or incentives to purchase items by creating shared pages that are centered about an item launch, an item sale, a store sale, and/or other event that the marketer wishes to promote. Users may accept invitations to the shared page and may provide and receive updates via the shared page in order to receive a promotion or otherwise be updated with respect to the promotion. 911 and other emergency services may use the platform to render emergency and other service assistance to users who create shared pages related to emergencies or other situations in which service providers may render assistance. Government agencies may use the platform to issue alerts such as weather alerts, emergency broadcast messages, and/or other informational messages.

Other objects and advantages of the invention will be apparent to those skilled in the art based on the following drawings and detailed description.

DETAILED DESCRIPTION OF THE INVENTION

The invention relates to systems and methods for providing an event-based and shared page connectivity platform that creates and communicates shared pages based on location and other information obtained from devices that automatically provide such information.

The "shared page" (used interchangeably with "page" herein) includes an integrated set of content, which may include information that describes the type or nature of the request and information that is related to the user. Information related to the user may include information about the user that is pre-stored in the system or information currently learned about the user. For example, the information related to the user may include a medical history, demographic information, a current location of the user, and/or other information related to the user that may be pre-stored in the system or learned about the user.

In some embodiments, the shared page may be agnostic to a communication channel that is used to communicate the page to various users. In this manner, even if one communication channel such as a data channel is unavailable, another communication channel such as a Short Message Service ("SMS") channel may be used to provide the page to a user.

Whichever communication channel is used, the system may provide the page to various users, including the user making the request and the operator, thereby facilitating communication and updates between the various users in real-time. Different users may receive the page over different communication channels.

In some embodiments, the system may identify various other users with whom the page should be shared. For example, the system may identify responders who service the request, contacts of the user, and/or others who may be interested in the request or otherwise may be involved in responding to the request. The users with whom the page is shared may update the page and the updated page may be provided to the various users. In this manner, each user with whom the page is shared may provide updates to other users.

Other implementations and uses of the system will be apparent based on the disclosure herein. Having provided a broad overview of a use of the system, various system components will now be described.

Figure 1:
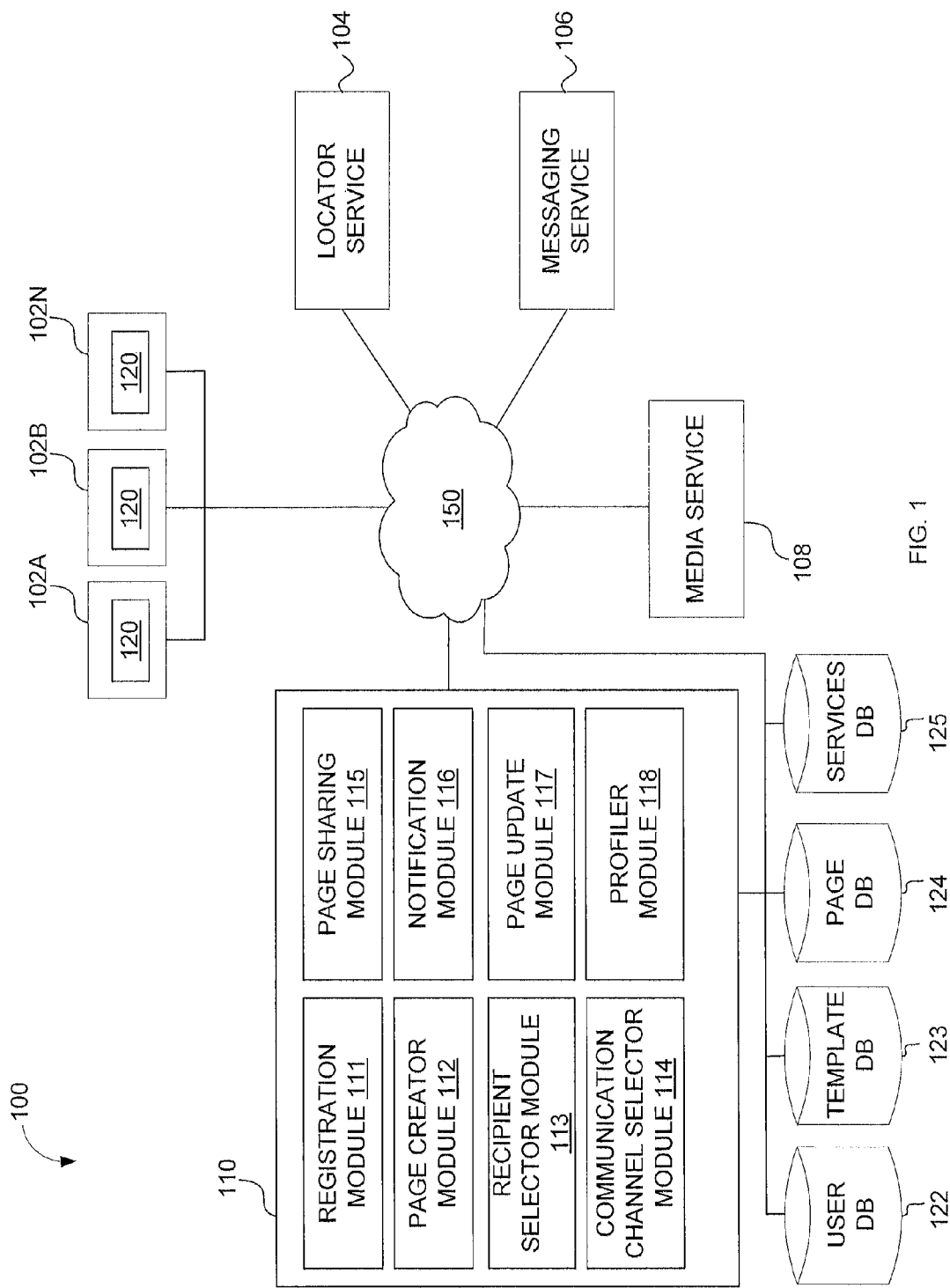
FIG. 1 illustrates a system for create event-centric shared pages based on automatically updated information from various devices, according to an aspect of the invention

FIG. 1 illustrates a system 100 for create event-centric shared pages based on automatically updated information from various devices, according to an aspect of the invention. In some embodiments, system 100 may include a page server 110, user devices 102 (illustrated in FIG. 1 as user device 102A, 102B, . . . , 102N), a locator service 104, a messaging service 106, a media service 108, a user database 122, a template database 123, a page database 124, a services database 125, a network 150, and/or other components.

In some embodiments, page server 110 may include one or more computers programmed to execute computer program modules. Through these program modules, page server 110 may create and update shared pages that are communicated to various devices, receive and process a service request, which may be processed as a shared page, receive information, which may be automatically generated and communicated from the various devices, update the shared page using the received information, and/or perform other functions. For example, page server 110 may include a registration module 111, a page creator module 112, a recipient selector module 113, a communication channel selector module 114, a page sharing module 115, a notification module 116, a page update module 117, a profiler module 118, and/or other modules for performing the functions described herein.

In some embodiments, registration module 111 may obtain information about the user that may be useful for first responders or other service personnel responding to the user's request. In some embodiments, the user information may include personal information, medical information, emergency contact information, contact share information, authentication information, and/or other types of information known about or received from the user.

Personal information may include a name, an address, a phone number, a date of birth, and/or other personal or demographic information of the user. Medical information may include a blood type, a pre-existing medical condition, a medical history (including family medical histories), a medication being taken, an allergy, and/or other information related to the user's medical condition. Emergency contacts may include an emergency contact name (not to be confused with, for example, a 911 operator), an emergency contact phone number, a physician name, insurance name/information, and/or other information that may be useful in an emergency.

Contact share information may identify other users or entities for which a page should be shared. For example, the user may specify family members, friends, colleagues and/or users or entities for which a generated page should be communicated. In this manner, if the user requests assistance, the contacts of the user may be notified of the request via the page. In some embodiments, the contact share information may specify roles of the contacts such that different roles receive different types of pages. For example, a role may specify that pages related to all types of requests should be communicated to a user assigned with the role and another role may specify that only pages related to particular types of requests should be communicated to a user assigned with the other role.

In some embodiments, registration module 111 may register various devices for use with the system. For example, registration module 111 may register various user devices 102, devices 102 and/or other devices that may obtain a shared page and/or communicate information that is used to automatically update the shared page. In some embodiments, various devices that serve as information sources may be added to a shared page (or a template that is used to create the shared page) such that the information provided by the information source is included in the shared page. For example, a fixed camera that can stream or otherwise provide images over a communication channel may be included in shared page. In this manner, a user may add images from a traffic, security, and/or other camera to a shared page.

In some embodiments, registration of the various devices may include obtaining an identification of the device so that the system may recognize who (or what entity) is providing requests for information, information to update a shared page, and/or otherwise recognize who or what is communicating with the system. For example, a user device 102 may be registered to interact with the system in various ways described herein.

In some embodiments, various functions of the system may require authentication such as entry of a personal identification number ("PIN") or other predefined secret from the user. As such, registration module 111 may receive and store the authentication information for later authentication.

In some embodiments, registration module 111 may register certain triggers and other information that are used to create a shared page. For example, a user may wish for a shared page to be created when the user is at a particular geo-location (such as when a user device 102 associated with the user is within a geo-fenced area, or a geographically definable location). Registration module 111 may register the user device 102 such that the location of the device may be tracked in order to trigger a shared page when the user device 102 is detected to be within the geofence. Likewise, registration module 111 may register a vehicle or vehicle service that notifies the system of when the vehicle has been in a collision such that a shared page is automatically created based on the notification that the collision has occurred. In this manner, registration module 111 may be used to register and store information that is used to automatically trigger creation of a shared page.

In some embodiments, the registration process may include installation of one or more computer program modules 120 that configure a device of a registrant to generate an interface for exchanging communications as described herein. Such computer program modules 120 may include mobile applications operating on a mobile device, an application executing on a desktop, laptop or other device, and/or other instructions that program a device to display communications or otherwise perform functionality described herein. The registration process may include an initial registration as well as updates to the user information. Upon registration, a user may generate shared pages that are shared to various others via their respective devices.

In some embodiments, page creator module 112 may create a shared page based on an input by a user, automatically based on a trigger, and/or other information that causes a shared page to be created.

In some embodiments, page creator module 112 may receive a request from a user to create a shared page. For example, page creator module 112 may receive an indication that a user interface member of a user device 102 and/or an interface component of a graphical user interface related to the system (e.g., a mobile application interface, a web page, etc.) has been manipulated. In response, page creator module 112 may generate a page that is shared amongst the user's contacts and/or other relevant parties that should have access to the shared page as indicated during the registration process or otherwise preconfigured by the system. In this manner, page creator module 112 facilitates event driven pages that can be created on-the-fly to which others may obtain and provide updates.

In some embodiments, page creator module 112 may automatically create a shared page to be created based on a trigger. The trigger may include a time-based trigger, a location-based trigger, an event trigger, and/or other information that causes a shared page to be automatically created.

In some embodiments, page creator module 112 may determine that one or more devices 102 are within one or more geofences. For example, page creator module 112 may obtain and monitor the location of a device 102 such that when the device 102 enters or crosses a geographical location, a shared page is automatically created. For example, page creator module 112 may automatically create a shared page as a user (as determined from a corresponding device 102 associated with the user) begins a commute home, when a user is within a predefined distance away from a destination (as defined by a geofence, for example), when a user is within a predefined distance of another user, and/or when a user is otherwise at a particular location.

In some embodiments, page creator module 112 may monitor and/or otherwise determine that a vehicle has been involved in a collision. For example, a third party vehicle monitoring service may be registered with the platform such that page creator module 112 receives indications of collisions from the third party vehicle monitoring service. Likewise, page creator module 112 may receive similar indications from a home or business security company. In any event, based on the indication of a collision, alarm, and/or other trigger, page creator module 112 may automatically cause a shared page to be created.

In some embodiments, the request may include a location of a user device (such as user device 102) from which the request is made. For example, the user device may obtain its location via GPS or other location technique and supply the location to page server 110. In other embodiments, the service request does not include the location of the user device. For example, the user device may be unable to obtain the location or may otherwise not include the location with the service request. In these embodiments, page creator module 112 may generate query locator service 104 to determine the location of the user device. Locator service 104 may include a mobile network service carrier that may locate the user device based on the base station with which the user device is connected. In some embodiments, locator service 104 may include an internet service provider that may determine a location of the user device based on an Internet protocol address or other identification that allows a location to be determined. In some embodiments, page creator module 112 may request the user to input the location via voice, text, and/or other inputs.

In some embodiments, page creator module 112 may obtain information about the user, sensor sets from the various devices (e.g., location information, motion information, video, audio, and/or other sensor information), information related to the location of the user (such as ambient conditions and crime reports related to the location), and/or other information that may be related to the service request. For example, page creator module 112 may query user database 122 to obtain all or a portion of user information that was stored during the registration process. In some embodiments, page creator module 112 may obtain location information and/or other information from various user devices 102. The location information and other information may be provided automatically by the various devices without intervention by the user of each respective device.

In some embodiments, page creator module 112 may receive media such as video, audio, pictures, text, and/or other media content from user device 102. For example, via user device 102, a user having an emergency situation or otherwise wishing to share media may stream video and/or send a video file in association with an emergency request. The video, audio, pictures, etc., may capture the situation in order to document what is happening.

In some embodiments, page creator module 112 may retrieve a template that serves as a basis for creating a page. The template may be configured by a user in order to customize shared pages that are created based on the template. The template may include default information to include (or exclude). In some embodiments, all templates may have at least some information or elements that are common to each template.

In some embodiments, different templates may be created and used for different communication channels. For example, a page that is to be shared via a broadband communication channel may be formatted differently than a page that is to be shared via Short Message Service ("SMS") text. For example, a page shared over SMS text may include less detail and content than a page shared over a broadband connection. In some of these embodiments, page creator module 112 may generate different versions of the page based on the communication channel over which the page is to be communicated.

Figure 6:
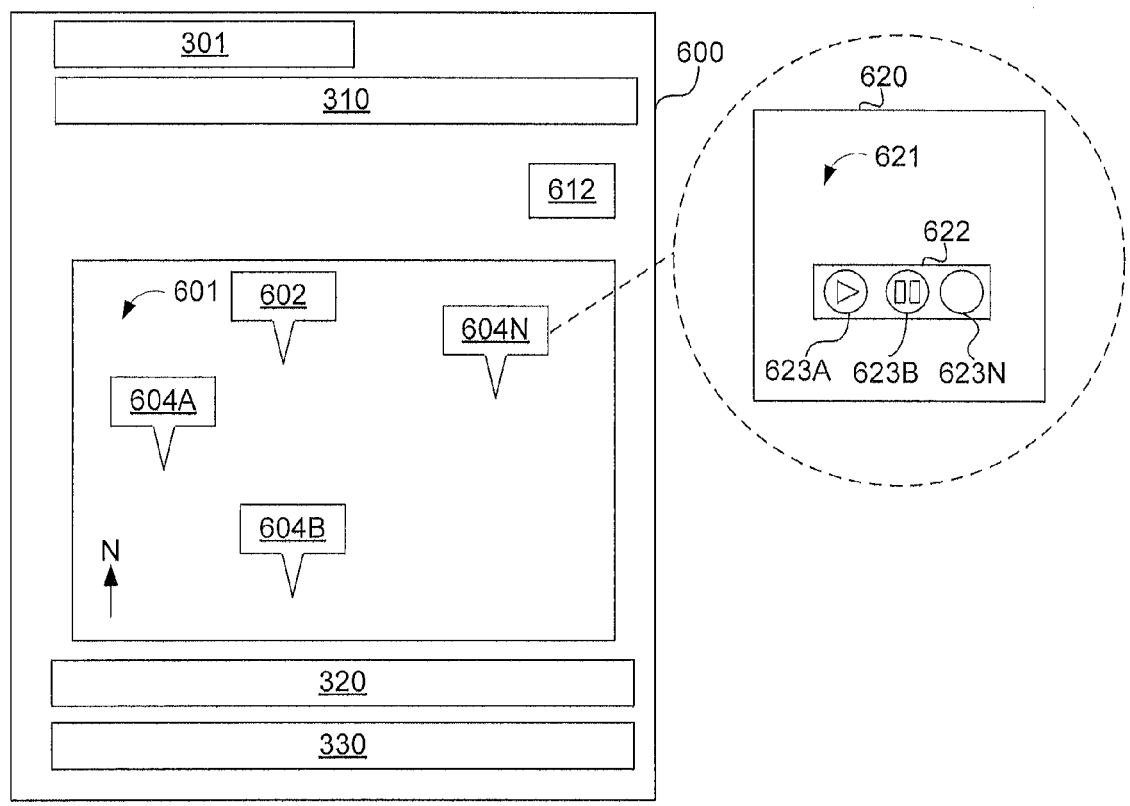
FIG. 6 illustrates a page interface that illustrates a page that Is viewable by various users and devices, according to an aspect of the invention.

In some embodiments, page creator module 112 may generate a page based on at least some of the obtained user information, media files/streams, templates, and/or other information known or obtained about the user, information related to the surrounding location, and/or information from other users. In some embodiments, the page may include a map overlaid with an indicator that indicates a location of user device 102. The page may display information manually and/or automatically provided by the various user devices 102 with which the shared page is shared. A non-limiting example of a page generated by page creator module 112 is illustrated in FIG. 6. The created page may be updated when various users with whom the shared page has been shared (including any users who caused the shared page to be created) provide updates to the page, as set forth in more detail below.

In some embodiments, page creator module 112 may be configured to determine that user device 102 is at a particular location based on the location information. Page creator module 112 may identify one or more fixed assets based on the particular location. For example, a fixed asset may include a retailer shop, a security or traffic camera, a microphone, and/or other asset with which information may be associated and has a fixed location. In particular embodiments, the fixed asset may be related to information such as a description of a retailer shop, video or other images from the camera, audio from the microphone, and/or other information. In some embodiments, page creator module 112 may include the information related to the one or more fixed assets in the shared page.

In some embodiments, page creator module 112 may generate the page in a format such as extensible markup language. In these embodiments, the communicated page may include content of the page that can be parsed by recipient devices (such as device 102, device 140, operator device 132, and responder device 134) to generate the page according to local device capabilities. For example, a particular recipient device may be unable to display video and may ignore any video feed and/or may request that page server 110 transmit audio or text versions of the video feed if possible.

In some embodiments, recipient selector module 113 may identify users who should receive the shared page. Using various logic or rules, which may include specifications by the user during registration, recipient selector module 113 may identify various users with whom a page should be shared.

In some embodiments, recipient selector module 113 may identify a recipient that should receive the shared page based on input from another user, a time, a location of the recipient, a user profile for the recipient, and/or other information used to identify recipients. In some embodiments, recipient selector module 113 identifies a recipient of the shared page based on user input. For example, recipient selector module 113 may receive an identification of a user with whom the page should be shared. The identification may be received from the user who created the page and/or other users with whom the page has been shared. In some embodiments, the identification may be based predefined rules such as "share pages I create with all contacts."

In some embodiments, recipient selector module 113 may automatically identify a recipient based on a time, a location, a user profile, and/or other information. A time may an expiration time and/or other time related to a shared page. For example, recipient selector module 113 may identify a recipient to receive the shared page based on an expiration time of the shared page. If a shared page has not yet expired, recipients who are reachable by the system (e.g., logged onto the platform or otherwise available) may be identified to receive the shared page.

In some embodiments, recipient selector module 113 may automatically identify a recipient based on a location of a user. For example, a shared page may be directed to a particular geofenced area such that users who are in the geofenced area may be identified to receive the shared page.

In some embodiments, recipient selector module 113 may automatically identify a recipient based on a user profile. For example, the platform may store one or more user profiles in a database such as user database 122 based on registration information obtained from the user, user interactions with shared pages, and/or other information known about the user. A shared page may be directed to particular types of users (e.g., residents of a certain zip code, users who have a shared interest, etc.). Recipient selector module 113 may identify a recipient based on the recipient's user profile.

Other information known about a user's current and/or previous activities may be used to identify that user as a recipient. For example, a user's speed may be used to identify the user as a recipient of a shared page related to road safety.

In some embodiments, various combinations of information may be used to identify a recipient. For example, recipient selector module 113 may identify recipients of a shared page based on a combination of location (where they are), user profile (who they are), and/or other information.

In some embodiments, communication channel selector module 114 may determine which communication channel to use in order to share the generated page. Communication channels may include various mobile telecommunications networks such as, without limitation, fourth generation telecommunication network ("4G"), third generation telecommunication network ("3G"), the Internet, Public Switched Telephone Networks, Short Message Service messaging over mobile communications networks, peer-to-peer networks, ad hoc networks, and/or other technologies that allow data or voice communication.

In some embodiments, the communication channel may be selected based on current availability and/or configurable rules that define which communication channel to use. In some embodiments, certain communication channels may be preferred over others. For example, communication channel selector module 114 may preferentially use a broadband communication channel such as fourth generation telecommunication network ("4G") if available. If 4G is unavailable, communication channel selector module 114 may use a third generation telecommunication network ("3G"). If neither is available, communication channel selector module 114 may share the generated page using Short Message Service ("SMS") text format, PIN-to-PIN messaging, and/or other communication channel that may be available to share pages to intended recipients.

In some embodiments, communication channel selector module 114 may determine whether a communication channel is available by sending a communication over the channel and waiting for a response. If a send failure message is received or if no response is received within a timeout period, communication channel selector module 114 may determine that the communication channel is unavailable. In this manner, even when certain communication channels are down due to congestion or other reason, pages may be shared among intended recipients (including the original requestor) so long as a viable communication channel is available. Communication channel selector module 114 may share the page over the communication channel(s) that are available and use the appropriate version created by page creator module 112 for the communication channel.

In some embodiments, page sharing module 115 may share the page to recipients identified by recipient selector module 113. In some embodiments, page sharing module 115 may share the page via one or more communication channels selected by communication selector module 114.

In some embodiments, page sharing module 115 may allow the requestor using user device 102 to share the page with other users not identified by recipient selector module 113. This allows the requestor to dynamically share the page with additional users after the page is generated and shared.

In some embodiments, page sharing module 115 may allow a user other than the requestor to share the page with another user not identified by recipient selector module 113. This may allow users with whom the page has been shared to share the page with another user. In some embodiments, page sharing module 115 may use configurable roles to implement who may share the page with other users. In some embodiments, all or only a portion of users may be associated with a role that allows them to share a page. For example, a user who created a shared page may specify who may share pages, who may view pages (including group-level views such as all contacts, the general public, a subset of contacts, etc.), who may update a shared page, what types of updates may be made (e.g., types of media that may be updated), who may modify information on the shared page, who may delete information on the shared page, and/or specify other permission roles.

In some embodiments, the recipients with whom the page has been shared may be registered users themselves operating a device 102. In other embodiments, a recipient may not be registered with the system but may still receive the page via, for example, a webpage secured by a secret such as a password, a uniform resource locator that is not publicly known, and/or other technique in which to share a secure webpage or other interface.

In some embodiments, page sharing module 115 may discontinue sharing the shared page (e.g., close the shared page such that it is no longer accessible) based on an expiration time, a triggering event that closes the shared page, a user input to close the shared page, and/or other information that causes the shared page to be closed. The expiration time may be predefined such that the shared page is set to expire at a particular time. The triggering event may include a user exiting a geofence or otherwise moving from one location to another location. The user input may include an indication by a user to discontinue the shared page.

In some embodiments, notification module 116 may be configured to notify various users with whom the page has been shared (including any users who created the shared page) of the creation, update, expiration, and/or other status updates related to the shared page. For example, notification module 116 may cause a notification that a shared page has been updated to be provided to the recipients via one or more communication channels. A messaging service 106 (e.g., SMS text message, email, social media platform, etc.) may be used to convey the notification. In some embodiments, the notification may provide a link to or other instructions to access the shared page.

In some embodiments, page update module 117 may receive updates related to the generated page. Updates may be automatically provided and/or initiated by a user providing the update.

In some embodiments, the updates may include information automatically obtained from various devices that have access to the shared page. For example, user device 102 may automatically communicate sensor information at various times without intervention by a user. For example, user device 102 may periodically communicate location information, motion information, video, audio, and/or other information from the user device without the user's intervention. Other user devices and various other devices described herein may similarly provide such automatically communicated information such that page update module 116 may automatically update a shared page.

In some embodiments, page update module 117 may receive an update from the requestor. The update from the requestor may include a location update (e.g., whether the requestor has moved or remains stationary), media updates (e.g., new video, audio, image, text, etc.), information updates (e.g., "I'm OK now"), and/or other information that is related to the page.

The updated page may be propagated to users for which the page has been shared. For example, the updated page is propagated to the user making the service request, responders, and/or other users for whom the page has been shared. In some embodiments, the updates to the page may be made as they are received. In this manner, page update module 117 may facilitate communication between users with whom the page has been shared. In some embodiments, page update module 117 may send out a communication independent from the page (e.g., via an email to a contact's email address) indicating the updates.

In some embodiments, page update module 117 may update the page in various ways. For example, media may be added to, updated, or removed from the page as appropriate. Messages to and from various users who share the page may be updated. In some embodiments, a media service 108 (such as a third party media provider) may be used such that media may be linked from and/or embedded within a shared page. A map indicating the location of the users are taking/will take, estimated time/distance of arrival of responders, points of interest, routes to points of interest from the location of the user, and/or other information relevant to the shared page may be updated. In some embodiments, page update module 117 may tag or associate each update with a timestamp so that events may be tracked, retrieved, and viewed throughout the course of the shared page.

In some embodiments, profiler module 118 may be configured to generate user profiles that are used to identify users who should receive a shared page. In some embodiments, profiler module 118 may use information known about the user such as from registration information, interaction with and within shared pages, and/or other information known about the user. In some embodiments, profiler module 118 may include a cloud-based algorithm that learns user behavior and/or characteristics and continually updates a user profile based on the learned behavior. For example, profiler module 118 may determine that a user has particular interests based on the user's interaction with shared pages. In another example, profiler module 118 may analyze contacts of the user in order to refine the user profile based on other users with whom the user associates. In this example, profiler module 118 may use a profile generated for a contact of the user in order to more fully understand the user. A user having contacts who are interested in a particular topic may indicate that the user is also interested in the particular topic. As such, profiler module 118 may use contacts or other users' profiles associated with the user to determine or update the user profile.

Other uses and implementations of page server 110 will be apparent to those having skill in the art based on the disclosure herein. Having provided an overview of implementations and components of page server 110, various other components of system 100 will now be described.

In some embodiments, page server 110 may include or otherwise access various databases to store and/or retrieve information. The various databases may include, for example, a user database 122, a template database 123, a page database 124, a services database 125, and/or other databases. User database 122 may store information known or obtained about a user such as user information received during the registration process. Template database 123 may store templates used to create a page. Page database 124 may store information related to a page. For example, when page creator module 112 generates a page, a page identifier that identifies the page may be generated and stored in page database 124. The page identifier may be associated in page database 124 with various content and updates to the page such as, for example, an identity of the requestor, a location of the requestor or other users, status updates, workflow updates, media content, and/or other information related to the generated page.

In some embodiments, page database 124 stores a record of users (e.g., operators, contacts, responders, etc.) with whom the page has been shared. In this manner, page database 124 allows retrieval of content related to a generated page as well as an identification of users who had access to the page. At least some records stored by page database 124 may be time stamped such that page content may be generated in real-time and/or a historical timeline of events related to the page may be generated. Services database 125 may store information about service providers. For example, emergency service providers and their respective service locations may be stored in services database 125 so that appropriate emergency service call centers or operators may be identified. In some embodiments, service database 125 may store any API interface calls that a service provider may use to access its systems.

In some embodiments, user devices 102 may each be or may include a mobile device, one or more computing devices (e.g., specialty computing systems, desktop computers, personal computers, mobile computing devices, tablet computing devices, smart-phones, or other computing devices) having one or more processors (e.g., microprocessors), memory devices (e.g., hard disk, RAM, EEPROM, etc.), input/output components, and/or other computing components for performing the features and functions described herein (and/or other features and functions). Each of the foregoing devices may have one or more user interfaces such as a keypad, a display, a voice recognition microphone and speaker to interact with a distressed user. In some embodiments, each of the foregoing devices comprises a processor coupled to a memory over a bus to carry out the features and functionalities of the embodiments described herein. In some embodiments, each of the foregoing devices comprises one or more computer program modules 120 residing in the memory thereof and generating a display that is displayed to the user via the display. Each of the foregoing devices may have an antenna to wirelessly communicate with other components of system 100 over network 150 or independent of network 150.

In some embodiments, user devices 102 may each include a Global Positioning System (GPS) unit to determine its location, allowing each device to transmit its location to other components in system 100. Alternatively or additionally, each of the foregoing devices may be Global System for Mobile Communications (GSM) enabled to convey its location. Other techniques for locating these devices may be used such as multilateration and input by an operator of each device.

In some embodiments, user devices 102 may each be programmed with one or more computer program modules 120 (used interchangeably with "application 120" or "user application 120") to display pages, update pages, communicate with page server 110 and other users, and/or perform other functions related to a page as described herein.

In some embodiments, user application 120 may provide a programmed device with general functionality that may be common to all of the programmed devices. For example, user application 120 may provide an audio and/or visual interface to communicate with other components of system 100 via one or more input components (e.g., hard or soft buttons, tabs, voice recognition inputs, etc.). The one or more input components may be responsive to touch, voice, or other forms of user inputs. In some embodiments, user application 120 may display or otherwise provide control of one or more of the generated pages. For example, in some embodiments, user application 120 may display a map with various location based identifiers and indicators that show the location of various entities and assets such as responders as discussed herein.

In some embodiments, user application 120 may provide functions that are specific to the context in which they are used. For example, a responder device 134 may include functionality that a contact device 140 may not have and vice versa. It should be noted that user application 120 may provide the same functionality to a contact device 140 and user device 102. For example, a user of contact device 140 may be registered to send out a service request and a user of user device 102 may be a contact of the user of contact device 140.

In some embodiments, user application 120 may program user device 102 to include an interface for generating a service request or alert message. User device 102 may display a user interface that includes a plurality of input components such as icons or buttons that may be selected by the user to initiate a service request (or alert message) corresponding to the input component. For example, an input component may correspond to a type of service request. In some embodiments, a user may configure (e.g., during registration) which services the user wishes to display on the interface. For instance, a user may be subscribed to some services but not others. In some embodiments, an emergency service is included in each user application 120 operating on user device 102 irrespective of user configurations.

In some embodiments, one or more input components may be color-coded or otherwise displayed differently from other input components to indicate various levels of urgency or various types of situations.

In some embodiments, network 150 may be or include a communications network capable of supporting one or more modes of communications, including but not limited to, wireless, wired, and optical communications. For example, network 150 may comprise cell phone towers or other wireless communication infrastructure, public switched telephone networks (PSTN), active and passive optical networks, and combinations thereof. Examples of such networks may include computer implemented networks such as the Internet, a local area network (LAN), a wide area network (WAN), etc.

Those having skill in the art will recognize that user devices 102 may each comprise one or more processors, one or more interfaces (to various peripheral devices or components), memory, one or more storage devices, and/or other components coupled via a bus. The memory may comprise random access memory (RAM), read only memory (ROM), or other memory. The memory may store computer-executable instructions to be executed by the processor as well as data that may be manipulated by the processor. The storage devices may comprise floppy disks, hard disks, optical disks, tapes, or other storage devices for storing computer-executable instructions and/or data.

The databases 122-125 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The foregoing description of the various components comprising system 100 is exemplary only, and should not be viewed as limiting. The invention described herein may work with various system configurations. Accordingly, more or less of the aforementioned system components may be used and/or combined in various implementations.

Figure 2:
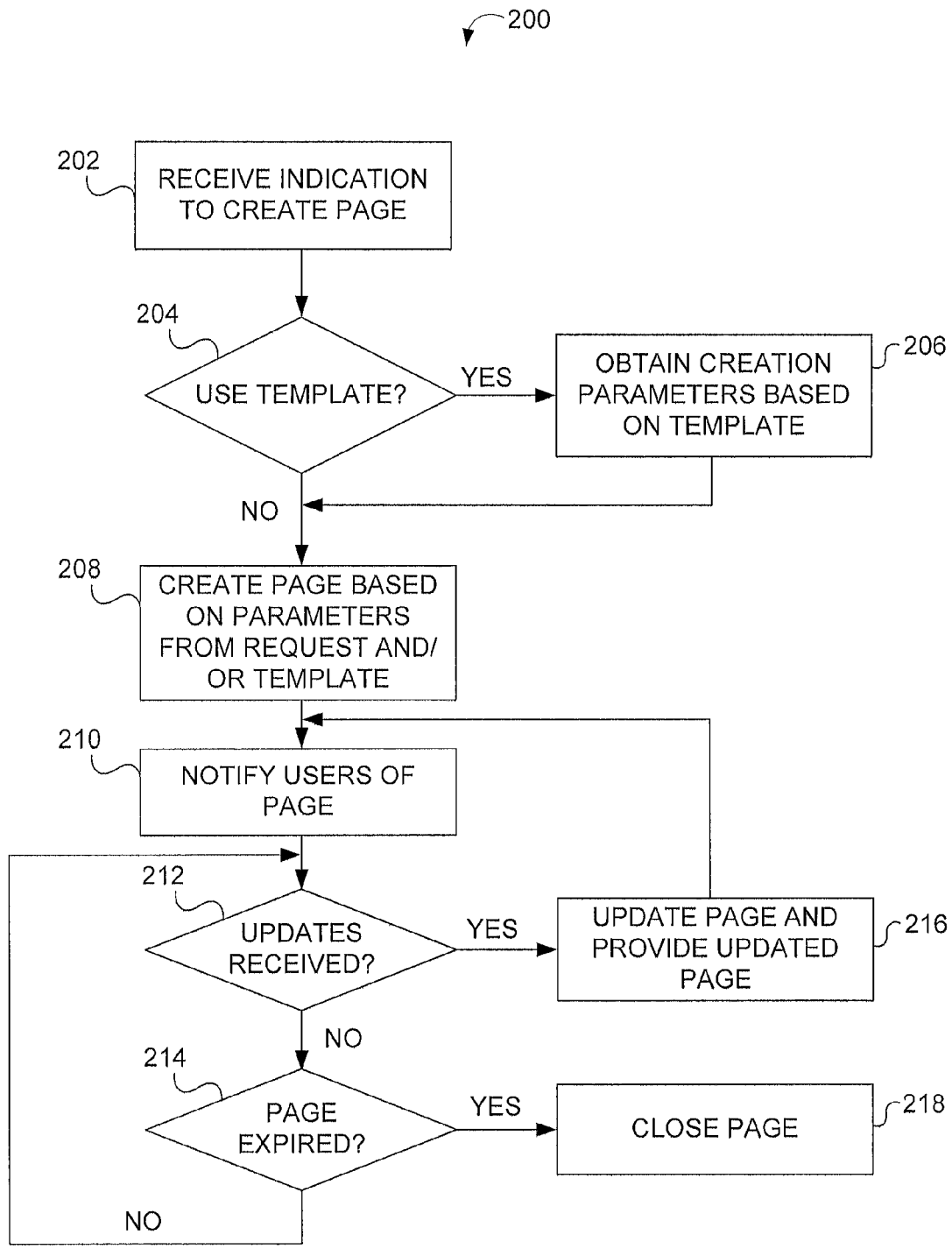
FIG. 2 illustrates a process for responding to service requests and facilitating communication between relevant parties, according to an aspect of the invention.

FIG. 2 illustrates a process 200 for responding to service requests and facilitating communication between relevant parties, according to an aspect of the invention. The various processing operations and/or data flows depicted in FIG. 2 (and in the other drawing Figures) are described in greater detail herein. The described operations may be accomplished using some or all of the system components described in detail above and, in some embodiments, various operations may be performed in different sequences. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 202, an indication to create a page may be received. The indication may originate from a user who is manually requesting to create a shared page (e.g., via input using a user interface for page creation) or from an automated process that is creating a shared page based on a trigger or other information.

In an operation 204, a determination of whether to use a template may be made. For example, the request may include a template identifier and/or the request may be associated with a template that should be used. If a template should be used, creation parameters used to create the shared page is obtained based on the template in an operation 206. In an operation 208, a page may be created based on creation parameters included in the request and/or creation parameters obtained from the template. In an operation 210, users associated with a shared page may be notified of the shared page. For example, users with whom the page has been shared (which may include any users who created the page) may be notified that the page has been created and/or updated.

In an operation 212, a determination of whether any updates have been received is made. Updates may include updates manually entered by a user and/or updates automatically provided by various user devices without intervention by a user. The updates may include video, image, audio, text, location information, motion information, ambient condition information, and/or other types of information. If an update is received, the shared page may be updated and provided to the various users with whom the page has been shared in an operation 216 and processing may return to operation 210, where the various users may be notified of the update.

In no updates have been received, a determination of whether the shared page has expired may be made in an operation 214. The shared page may be expired based on an expiration time, a triggering event that closes the shared page, a user input to close the shared page, and/or other information that causes the shared page to be closed.

If the shared page has expired, the shared page may be closed in an operation 218. In this case, the shared page may be inaccessible to the various users. In some embodiments, the user who created the may continue to have limited access to the shared page and/or may cause the shared page to be re-opened.

If the shared page has not expired, processing may return to an operation 212, where a determination of whether updates have been received is made.

FIGS. 3-6 illustrate examples of graphical user interfaces and elements thereof, according to various aspects of the invention. The interfaces and elements illustrated in the drawing figures are for illustrative purposes only. Various components may be added, deleted, moved, or otherwise changed so that the configuration, appearance, and/or content of the interfaces and elements may be different than as illustrated in the Figures. Accordingly, the graphical user interface objects as illustrated (and described in greater detail below) are exemplary by nature and, as such, should not be viewed as limiting.

In some embodiments, the interfaces and/or various components thereof illustrated in FIGS. 3-6 may be communicated from page server 110 to various executing devices that display the interfaces. The various executing devices may include, for example, user devices 102 and/or other device that is communicably coupled to page server 110 and able to display the interfaces and/or components. The interfaces and/or components may be communicated via a webpage executed by a browser, interfaces/instructions executed by a mobile application, and/or other program such as user application 120 that can read and execute instructions for generating the interfaces/components.

In some embodiments, the various interface components illustrated in the Figures may cause the executing device to perform corresponding functions described herein and/or may cause the executing device to request from page server 110 and/or other computing device remote from the executing device to perform the corresponding functions described herein.

Figure 3:
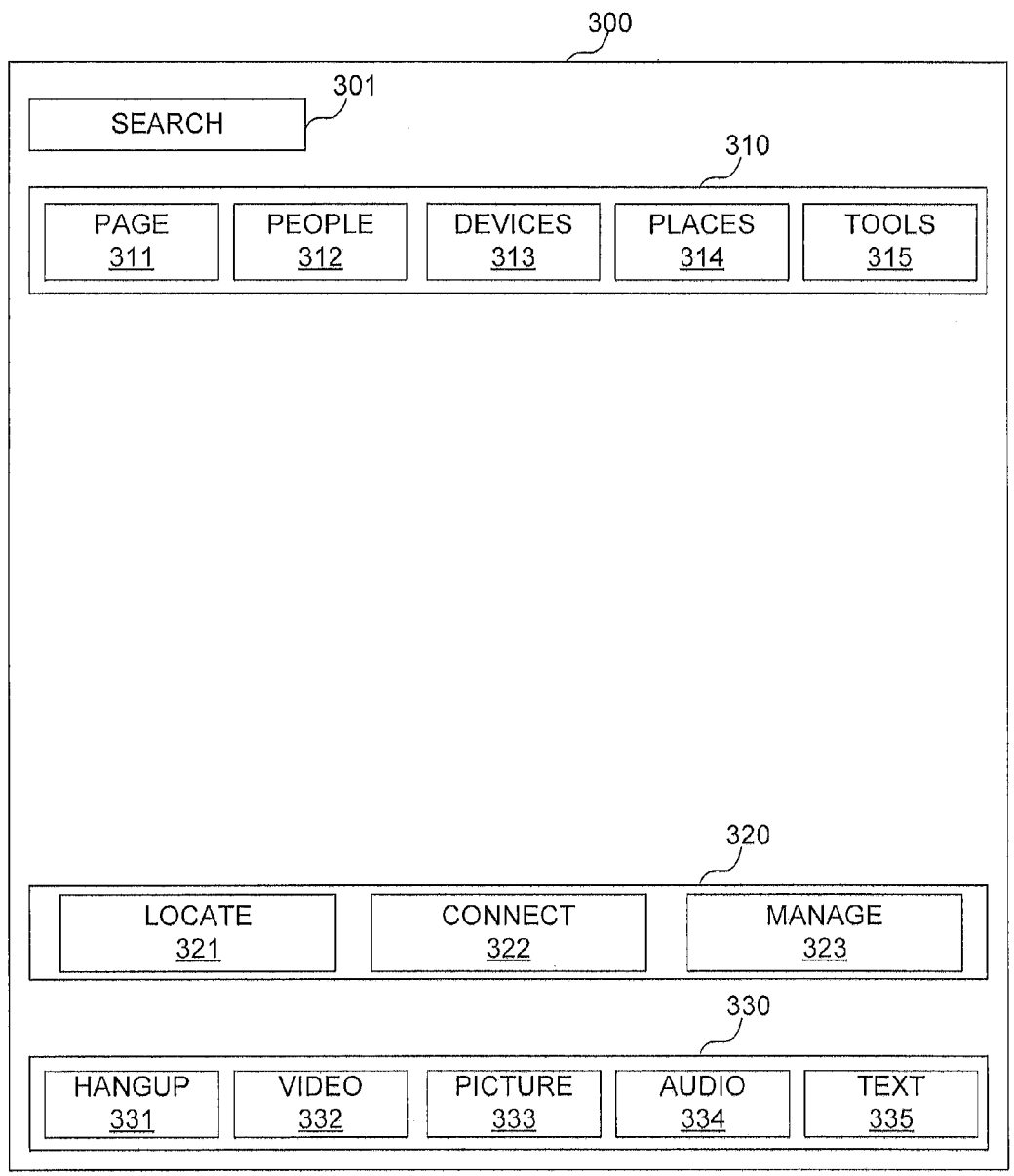
FIG. 3 illustrates examples of interface components that may be common to other interfaces illustrated in FIGS. 4-6, according to an aspect of the invention.
Figure 5:
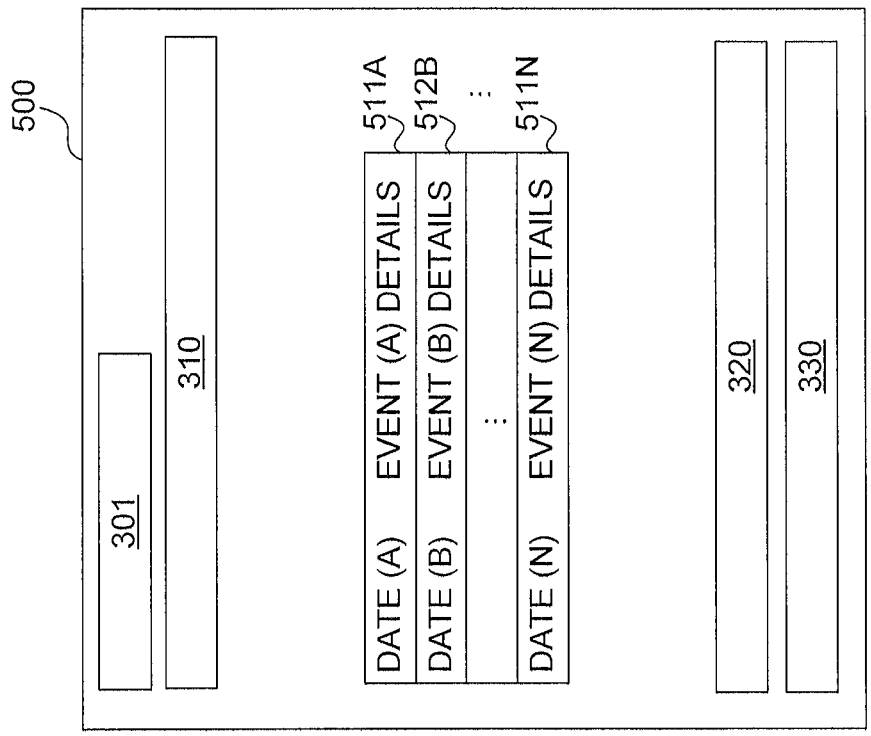
FIG. 5 illustrates a request notification screen that notifies an operator of incoming requests from various user devices, according to an aspect of the invention.
Figure 4:
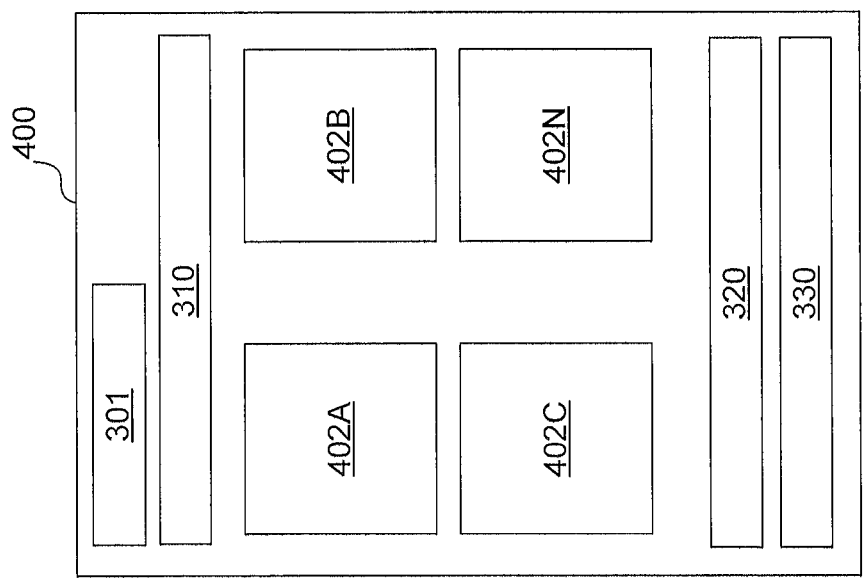
FIG. 4 illustrates a request selection screen used to make a request, according to an aspect of the invention.

FIG. 3 illustrates examples of interface components that may be common to other interfaces illustrated in FIGS. 4-6, according to an aspect of the invention. In other words, at least some of the interface objects illustrated in FIG. 3 may be included with other interfaces illustrated in FIGS. 4-6.

In some embodiments, the various interface components illustrated in the Figures may be context-specific. For example, different functions may be imparted to a component based on whether the component is displayed by a device that is a user device, a contact device, an operator device, a responder device, or other type of device. For example, the "devices" 313 component may reveal all devices related to the shared page.

Referring to FIG. 3, in some embodiments, search component 301 may be configured to receive one or more search terms. Upon input of the search terms, search component 301 may cause the executing device to execute a search query using a search engine and/or using page server 110. For example, search component 301 may be configured to receive a search term "hospital" and a resulting list of hospitals nearby the requestor or other location may be displayed.

In some embodiments, a toolbar 310 may include various tools to view various aspects of a request. For example, toolbar 310 may include a page component 311, a people component 312, an devices component 313, a places component 314, a tools component 315, and/or other components.

In some embodiments, page component 311 when selected may cause the executing device to display one or more pages to which the user operating the executing device has access. A user making the request, for example, may view a listing of current or past requests made by the user. An operator may view pages for which the operator is assigned requests. A responder may view pages for which the responder is tasked to respond to the request or event. A user contact may view pages for that a requesting user has shared with the user contact. If only one page has been shared with the user, selection of the page component 311 may cause the executing device to display the page (instead of a listing).

In some embodiments, people component 312 when selected may cause the executing device to display people associated with a page. For example, when selected while a page is being viewed, people component 312 may cause the executing device to display a listing of the requesting user, an operator, a responder, a user contact, and/or other people related to the page. Upon selection of a particular person, additional details about that person may be made available. For example, upon selection of the user making the request, the medical history and/or other information known or obtained about the user may be displayed.

In some embodiments, devices component 313 when selected may cause the executing device to display assets related to a page. For example, assets may include various responders such as an ambulance, a police car, a tow truck, a food/emergency supply vehicle, and/or other responders who are tasked with servicing the request. In some embodiments, the devices component 313 may be context-specific. For example, an operator device listing assets based on selection of the devices component 313 may include all assets at the operator's disposal while a user device may have access to only assets related to the page that was created to service the requesting user's request.

In some embodiments, places component 314 when selected may cause the executing device to display places related to a page. For example, when selected, places may cause a hospital, emergency shelter, and/or other places relevant to a page to be displayed.

In some embodiments, tools component 315 when selected may cause the executing device to display various tools such as a user information manager to be displayed. For example, using tools component 315, a user may set or update various user information such as display preferences, user authentication information, medical history information, and/or other information that is specific to a user.

In some embodiments, a page management component 320 may include various components for managing a page. For example, page management component 320 may include a locate component 321, a connect component 322, a manage component 323, and/or other components.

In some embodiments, locate component 321 when selected may cause the executing device to initiate a locate function. The locate function may request a location of various people, assets, places, and/or other items that may be located. For example, an operator may request to locate a particular responder. The request may be made to page server 110 and/or directly to the responder. In some embodiments, locate component 321 may be used by the operator to request a location of a user making the request. For example, if the request does not include a location, locate component 321 may be used to make a request to locator service 104 to locate the user (e.g., locate user device 102) making the request and/or other user or asset. Other users may similarly request a location of various users/assets as well.

In some embodiments, connect component 322 when selected may cause the executing device to initiate a connection with various users or assets. For example, a user making the request may wish to connect with a responder. Selection of connect component 322 may cause a direct connection to be established between the user and the responder. Other users may similarly request a communication with various users/assets as well.

In some embodiments, manage component 323 when executed may be used to manage various people, assets, places, etc. For example, when selected on an operator device, manage component 323 may cause the executing device to display requests from requesting users in order to dispatch responders. When selected on a responder device, manage component 323 may cause the executing device to display requests that have been assigned to the responder or otherwise display requests for which the responder may volunteer to service. When selected on a user device, manage component 323 may cause the executing device to display users with whom the page should be shared. Other users may similarly manage their respective aspects of a page using manage component 323.

In some embodiments, communication management component 330 may include various components for managing communications related to a page. For example, communication management component 330 may include a hangup component 331, a video component 332, a picture component 333, an audio component 334, a text component 335, and/or other components.

In some embodiments, hangup component 332 when selected may discontinue a communication between the executing device and a device remote from the executing device. For example, if a requesting user established a communication with a contact using connect component 322, the requesting user (or the contact) may terminate the established communication via the hangup component. In some embodiments, hangup component 332 may terminate the page. For example, the user making the request may terminate the page, thereby indicating that the service requested is no longer needed, was in error, or otherwise should be closed.

In some embodiments, video component 332 when selected may cause the executing device to initiate a video capture device to begin recording and/or streaming video. For example, the user making the request may begin to stream and/or record and send video that will be included on the page. In this manner, the user making the request and/or other user may update the page with video captured via the executing device.

In some embodiments, picture component 333 when selected may cause the executing device to initiate a photo capture device (which may include the same or different device than the video capture device) to take a picture. The executing device may communicate the picture to be included in the page.

In some embodiments, audio component 334 when selected may cause the executing device to initiate a microphone or other audio recording device to record or stream audio. The executing device may communicate the picture to be included in the page.

In some embodiments, text component 335 when selected may cause the executing device to display a keypad or keyboard for inputting alphanumeric or other characters to be included in the page.

Thus, using various input components, communications management component 330 may allow a user to record, stream, or otherwise communicate various forms of media to page server 110 or other remote device for updating the page. The communicated media may be included as part of the page so that other users are able to access the media in an integrated display with other content related to the page.

Various users may each use the search component 301, toolbar 310, page management component 320, and communication management 330 in order to view, update, and/or otherwise interface with the page in order to communicate with other users and obtain information related to the user making the request.

FIG. 4 illustrates a request selection screen 400 used to make a request, according to an aspect of the invention. In some embodiments, request selection screen 400 may be displayed by user device 102 to receive an input request or alert message. For example, request selection screen 400 may include various request components 402 (illustrated in FIG. 4 as request component 402A, 402B, 402C, . . . , 402N). Each request component 402 may be associated with a corresponding type of service or page to be created. For example, request component 402A when selected may cause a request for roadside assistance to be generated and request component 402B when selected may cause a request for emergency services to be generated. In some embodiments, a request component 402 may be colored, sized, shaped, or otherwise displayed differently from another request component. This may be to highlight certain services over others, such as highlighting an emergency request component.

In some embodiments, a request component 402C may include an "I'm OK" or other indication that communicates that the user making the request is fine and/or that an open page should be closed. Other types of request components 402 may be added as well. In some embodiments, a user of user device 102 may sign up for various different types of services administered by page server 110.

In some embodiments, upon receiving a selection of a request component 402, user device 102 may be programmed to generate a request to page server 110. The request may include the type of request being made. In some embodiments, user device 102 may be programmed to determine a location of user device 102 and include the location within the request. Upon receipt of the request by page server 110, the page server may then generate a page and route the page to an appropriate operator based on the type of request and/or the location as described herein.

FIG. 5 illustrates a request notification screen 500 that notifies an operator of incoming requests from various user devices 102, according to an aspect of the invention. In some embodiments, request notification screen 500 may be displayed on operator device 132 and used by an operator to view incoming requests. For example, page server 110 may generate a page in response to the user request (initiated as illustrated by, for example, FIG. 4) and then communicate a notification of the request and page via request notification screen 500.

In some embodiments, request components 511 (illustrated in FIG. 5 as request 511A, 511B, . . . , 511N) may display, for example, a date/time of receipt of a request and details concerning the request. For example, each request component 511 may display a type of request, a location of the user (e.g., location of a user device 102 used to make the request), and/or other information related to the incoming request.

In some embodiments, the request component 511 is selectable so that the operator may open a page that was generated by page server 110 based on the request. Using the page, an operator may use various tools with respect to toolbar 310 to dispatch/assign various assets to service the request.

FIG. 6 illustrates a page interface 600 that illustrates a page that is viewable by various users and devices, according to an aspect of the invention. In some embodiments, page interface 600 may include a map display 601, a user location indicator 602, people/asset location indicators 604 (illustrated in FIG. 6 as people/device/places location indicators 604A, 604B, ..., 604N), an information component 612, a media component 620, and/or other components.

In some embodiments, map display 601 may display a map, which may be displayed coincident with graphical objects (e.g., graphical objects may be embedded, overlaid, etc., onto the map or the map may be overlaid onto the graphical objects).

In some embodiments, user location indicator 602 may indicate a location of the user making the request. In some embodiments, the user location indicator may be selected to reveal information related to the user such as a geographic coordinate or other location indication, medical information, and/or other information known or obtained about a user.

In some embodiments, people/device/places location indicators 604 may indicate a location of various people such as user contacts, assets such as responders, and places such as hospitals. For mobile ones of the foregoing, the location indicators may be updated in real-time or based on a predefined interval. In this manner, each user or entity with whom the page has been shared may view a location of relevant people/assets/places. For example, the user making the request may be updated with a location of a responder or a contact who may be on the way. An operator may obtain a full understanding of the situation and location of assets.

In some embodiments, people/assets/places location indicators 604 may be selectable such that when selected, page interface 600 may display information known or obtained about the corresponding person, asset, or location. For example, selection of an asset location indicator cause to be displayed a description of the type of asset (e.g., police, fire, rescue, tow truck, etc.), an estimated time of arrival, a distance away, a name of a responder, and/or other information known or obtained about the asset.

In some embodiments, a people/device/places location indicator 604 may display an icon, photo, or other indication that indicates whether the indicator corresponds to a person, an asset, or a place.

In some embodiments, user location indicator 602 and/or people/assets/places location indicator 604 need not be selected to reveal the information known or obtained about the user, person, asset, or place. For example, space and format permitting, user location indicator 602 and/or people/assets/places location indicator 604 may display any or all of the known or obtained information.

In some embodiments, information component 612 may be selected to obtain information related to the page. For example, information component 612 may display page details such as information known or obtained about the user, assets, places, and/or other users or entities related to the page.

In some embodiments, media component 620 may display various media related to the page and shared by a user (associated with location indicator 604N as illustrated in FIG. 6). Although only one media component 620 is illustrated in FIG. 6, page interface 600 may include more than one media component 620, which may each display different content.

Media component 620 may include content 621, and content control 622. Content 621 may include video, photo, audio, text, and/or other media provided by the user making the request, a user contact, a responder, an operator, a place, and/or other user or entity with whom the page has been shared. In some embodiments, the displayed media may include news clips and/or other content related to the location or other information gathered from sources other than the users with whom the page has been shared. In this manner, disaster relief efforts, for example, may integrate news and/or other content related to an area related to the page. Content control 622 may include various controls 623 (illustrated in FIG. 6 as controls 623A, 623B, ..., 623N).

Figure 7:
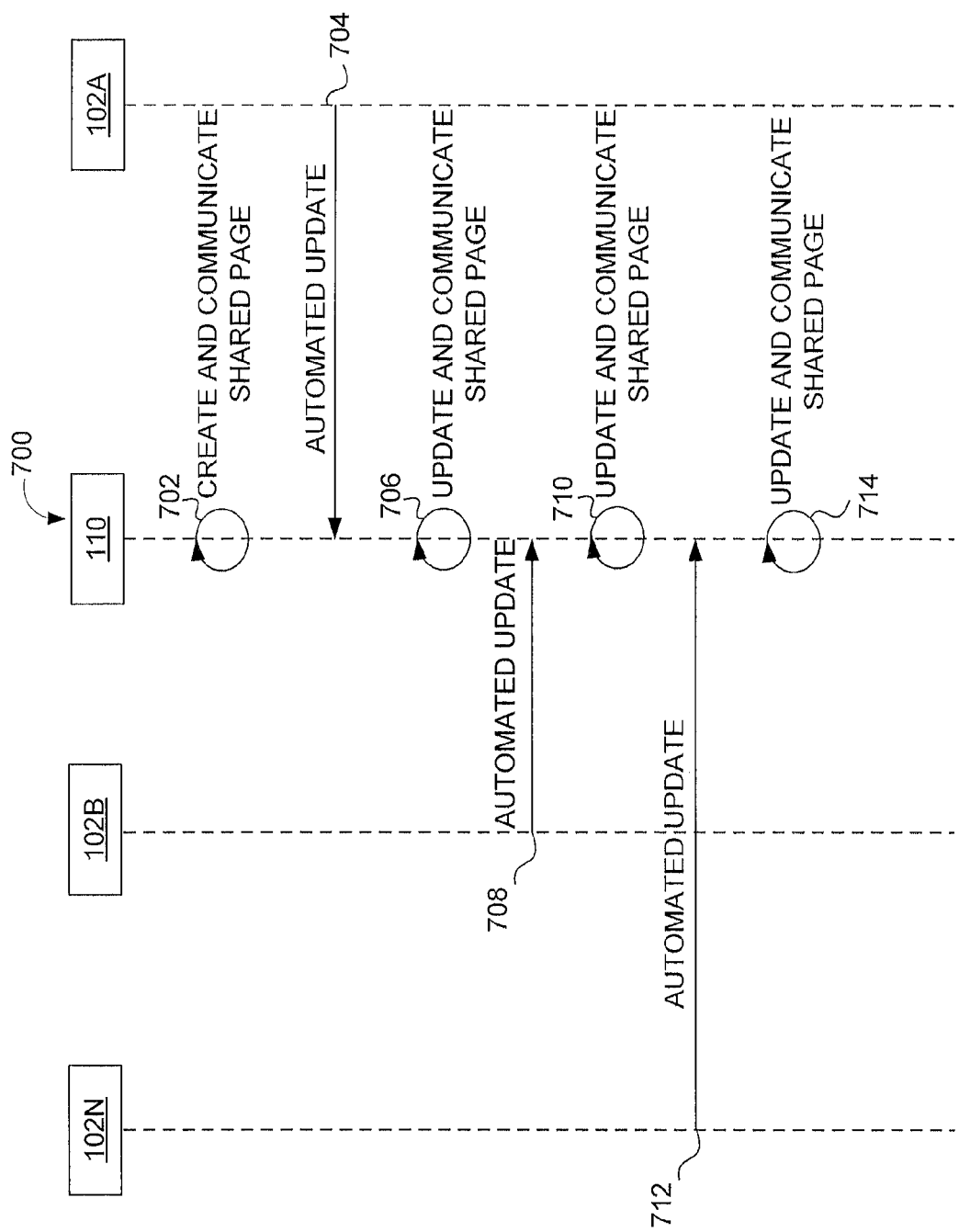
FIG. 7 illustrates a process of updating a shared page based on updated information automatically communicated from various devices that share the shared page, according to an aspect of the invention.

FIG. 7 illustrates a process 700 of updating a shared page based on updated information automatically communicated from various devices that share the shared page, according to an aspect of the invention. The automatic updates may be communicated from the various devices at various times such that real-time updates from the various devices may be used to update the shared page, which may then be communicated to the various devices such that each may receive a shared page that include updated information from ones of the various devices.

In an operation 702, page server 110 may create a shared page. In an operation 704, page server 110 may receive an update from device 102A. The update may be automatically communicated from device 102A at various times and may include location information that indicates a location of device 102A, motion information, audio, video, text, and/or other information.

In an operation 706, page server 110 may update the shared page and communicate the shared page with the various devices 102 and/or other devices that have access to the shared page.

In an operation 708, page server 110 may receive an update from device 102B. The update may be automatically communicated from device 102B at various times and may include location information that indicates a location of service provider 70, motion information, audio, video, text, and/or other information.

In an operation 710, page server 110 may update the shared page and communicate the shared page with the various devices 102 and/or other devices that have access to the shared page.

In an operation 712, page server 110 may receive an update from device 102N. The update may be automatically communicated from device 102N at various times and may include location information that indicates a location of the contact device, motion information, audio, video, text, and/or other information.

In an operation 714, page server 110 may update the shared page and communicate the shared page with the various device 102 and/or other devices that have access to the shared page.

The various systems, methods, and computer program products described herein may include components and features as described in co-pending U.S. patent application Ser. No. 13/740,826, filed Jan. 14, 2013, entitled "SYSTEM AND METHOD FOR RESPONDING TO SERVICE REQUESTS AND FACILITATING COMMUNICATION BETWEEN RELEVANT PARTIES," and co-pending U.S. patent application Ser. No. 13/742,827, filed Jan. 16, 2013, entitled "SYSTEM AND METHOD FOR RESPONDING TO SERVICE REQUESTS AND FACILITATING COMMUNICATION BETWEEN RELEVANT PARTIES," both of which are hereby incorporated by reference in their entireties.

The various user interface components described herein may include hard (e.g., mechanical) or soft (e.g., touch screen or touch pad) buttons, text inputs, icons, selection lists, and/or other user interface objects that may be used to receive an input and/or provide an output. As used herein, the term "selection," "select," "selected," "selecting," "manipulation," "manipulating," etc. with respect to user interface components or members may include, for example, pressing a hard or soft button, clicking, highlighting, hovering over, or otherwise indicating an interest in executing one or more functions related to the selected user interface component.

In the Figures, like numerals represent equivalent elements or features. Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A page sharing server configured to create event-specific shared pages based on automatically updated information from various devices, the page sharing server comprising:
   one or more processors programmed by one or more computer program instructions to:
   process a request, from a first user device, to create an event-specific shared page;
   determine whether a pre-stored template that was previously created by a user of the first user device from which the request to create the event-specific shared page is received should be used to create the event-specific shared page;
   obtain the pre-stored template responsive to a determination that the pre-stored template should be used;
   create, responsive to the processed request, the event-specific shared page based on the pre-stored template, wherein the pre-stored template (i) is predefined, and (ii) includes one or more parameters used to create the event-specific shared page;
   identify a second user device with which the event-specific shared page should be shared;
   provide the event-specific shared page to the first user device and the second user device;
   obtain first location information from the first user device from which the request to create the event-specific shared page is received, wherein the first location information indicates a location of the first user device at a first time;
   update the event-specific shared page based on the first location information;
   provide the updated event-specific shared page based on the first location information to the first user device and the second user device;
   obtain second location information from the first user device, wherein the second location information indicates a location of the first user device at a second time different from the first time, and wherein the first location information and the second location information are obtained automatically from the first user device without intervention by a user of the first device;
   update the shared page based on the second location information; and
   provide the updated event-specific shared page based on the second location information to the first user device and the second user device.

2. The system of claim 1, wherein the one or more processors are further programmed to:
   obtain third location information from the second user device at a third time and fourth location information from the second user device at a fourth time different from the third time, wherein the third location information and the fourth location information are obtained automatically from the second user device without intervention by a second user of the second user device;
   update the event-specific shared page based on the third location information; and
   update the event-specific shared page based on the fourth location information.

3. The system of claim 1, wherein the one or more processors are further programmed to:
   obtain audio from the first user device, the second user device, or both the first user device and the second user device, wherein the shared page includes the obtained audio or information related to the obtained audio.

4. The system of claim 1, wherein the one or more processors are further programmed to:
   obtain an image or video from the first user device, the second user device, or both the first user device and the second user device, wherein the shared page includes the obtained image or video or information related to the obtained image or video.

5. The system of claim 1, wherein the one or more processors are further programmed to:
   determine that the first user device is at a particular location based on the first location information; and
   generate an alert based on the determination that the first user device is at the particular location.

6. The system of claim 5, wherein the alert is based on a geo-fenced alert configured by the user of the first user device.

7. The system of claim 5, wherein the alert is based on a broadcast alert.

8. The system of claim 1, wherein the one or more processors are further programmed to:
   receive an indication that a first user interface member of the first user device has been manipulated, wherein the first user interface member is associated with the event-specified shared page such that the event-specified shared page is created based on the indication.

9. The system of claim 8, wherein the one or more processors are further programmed to:
   receive an indication that a second user interface member of the first user device has been manipulated, wherein the second user interface member is associated with a second event-specific shared page; and
   create the second event-specific shared page based on the indication that the second user interface member has been manipulated.

10. The system of claim 1, wherein the one or more processors are further programmed to:
    determine that the first user device is at a particular location based on the first location information;
    identify one or more fixed assets based on the particular location;
    obtain information related to the one or more fixed assets; and
    include the obtained information related to the one or more fixed assets in the event-specific shared page.

11. A method of creating event-centric shared pages based on automatically updated information from various devices, the method being implemented on one or more computing devices having one or more processors programmed with one or more computer program instructions, the method comprising:
    processing, by the one or more processors, a request to create a shared page from a first user device;
    determining, by the one or more processors, whether a pre-stored template that was previously created by a user of the first user device from which the request to create the event-specific shared page is received should be used to create the event-specific shared page;
    obtaining, by the one or more processors, the pre-stored template responsive to a determination that the pre-stored template should be used;

creating, by the one or more processors, responsive to the processed request, the shared page based on the pre-stored template, wherein the pre-stored template (i) is predefined, and (ii) includes one or more parameters used to create the event-specific shared page;
identifying, by the one or more processors, a second user device with which the page should be shared;
providing, by the one or more processors, the event-specific shared page to the first user device and the second user device;
obtaining, by the one or more processors, first location information from the first user device from which the request to create the shared page is received at a first time;
updating, by the one or more processors, the event-specific shared page based on the first location information;
providing, by the one or more processors, the updated event-specific shared page based on the first location information to the first user device and the second user device;
obtaining, by the one or more processors, second location information from the first user device, wherein the second location information indicates a location of the first user device at a second time different from the first time, and wherein the first location information and the second location information are obtained automatically from the first user device without intervention by a user of the first device;
updating, by the one or more processors, the event-specific shared page based on the second location information; and
providing, by the one or more processors, the updated event-specific shared page based on the second location information to the first user device and the second user device.

12. The method of claim 11, the method further comprising:
obtaining, by the one or more processors, third location information from the second user device at a third time and fourth location information from the second user device at a fourth time different from the third time, wherein the third location information and the fourth location information are obtained automatically from the second user device without intervention by a second user of the second user device;
updating, by the one or more processors, the updated event-specific shared page based on the third location information; and
updating, by the one or more processors, the updated event-specific shared page based the fourth location information.

13. The method of claim 11, the method further comprising:
obtaining, by the one or more processors, audio from the first user device, the second user device, or both the first user device and the second user device, wherein the shared page includes the obtained audio or information related to the obtained audio.

14. The method of claim 11, the method further comprising:
obtaining, by the one or more processors, an image or video from the first user device, the second user device, or both the first user device and the second user device, wherein the shared page includes the obtained image or video or information related to the obtained image or video.

15. The method of claim 11, the method further comprising:
determining, by the one or more processors, that the first user device is at a particular location based on the first location information; and
generating, by the alert module, an alert based on the determination that the first user device is at the particular location.

16. The method of claim 15, wherein the alert is based on a geo-fenced alert configured by the user of the first user device.

17. The method of claim 15, wherein the alert is based on a broadcast alert.

18. The method of claim 1, the method further comprising:
receiving, by the one or more processors, an indication that a first user interface member of the first user device has been manipulated, wherein the first user interface member is associated with the event-specific shared page such that the event-specific shared page is created based on the indication.

19. The method of claim 18, the method further comprising:
receiving, by the one or more processors, an indication that a second user interface member of the first user device has been manipulated, wherein the second user interface member is associated with a second event-specific shared page; and
creating, by the one or more processors, the second event-specific shared page based on the indication that the second user interface member has been manipulated.

20. The method of claim 1, the method further comprising:
determining, by the one or more processors, that the first user device is at a particular location based on the first location information;
identifying, by the one or more processors, one or more fixed assets based on the particular location;
obtaining, by the one or more processors, information related to the one or more fixed assets; and
including, by the one or more processors, the obtained information related to the one or more fixed assets in the event-specific shared page.

21. The system of claim 1, wherein the one or more processors are further programmed to:
receive an indication from the first user device or the second user device to share the event-specific shared page with a third user or third user device; and
provide the updated event-specific shared page based on the second location information to the third user or the third user device.

22. The system of claim 21, wherein the one or more processors are further programmed to:
obtain third location information from the third user device;
update the event-specific shared page based on the third location information; and
provide the event-specific shared page to the first user device, the second user device, and the third user device.

23. The system of claim 21, wherein the one or more processors are further programmed to:
obtain third location information from the second user device;
update the event-specific shared page based on the third location information; and
provide the event-specific shared page to the first user device, the second user device, and the third user device.

24. The system of claim 1, wherein the one or more processors are further programmed to:
identify the second user device based on an indication from the first user device.

25. The system of claim 1, wherein, to identify the second user device, the one or more processors are further programmed to:
- obtain an indication that the second user device is within a geofence location that is related to an event associated with the event-specific shared page; and
- determine that the second user device should be provided with the event-specific shared page based on the indication that the second user device is within the geofence location.

26. The system of claim 1, wherein, to identify the second user device, the one or more processors are further programmed to:
- obtain a user profile of a second user, wherein the user profile includes information that indicates an interest by the second user in an event associated with the event-specific shared page; and
- determine that the second user device should be provided with the shared page based on the user profile of the second user that indicates an interest by the second user in the event associated with the event-specific shared page.

27. The system of claim 1, wherein the event-specific shared page is associated with an expiration, and wherein the one or more processors are further programmed to:
- no longer receive updates after the expiration or no longer provide the event-specific shared page after the expiration.

28. The system of claim 1, wherein the one or more processors are further programmed to:
- receive one or more parameters from the first user device; and
- create the event-specific shared page based on the one or more parameters.

\* \* \* \* \*

UNITED STATES PATENT AND TRADEMARK OFFICE
CERTIFICATE OF CORRECTION

PATENT NO. : 8,965,988 B1  
APPLICATION NO. : 13/767450  
DATED : February 24, 2015  
INVENTOR(S) : Negahban et al.

Page 1 of 1

It is certified that error appears in the above-identified patent and that said Letters Patent is hereby corrected as shown below:

On Title Page, Item (75)
after "Allen Steven Kay, Woodcliff Lake, NJ (US)"
insert --; Sahand Negahban-Hagh, Cambridge, MA (US)--.

Signed and Sealed this
Sixteenth Day of February, 2016

Michelle K. Lee
*Director of the United States Patent and Trademark Office*